(12) United States Patent
James et al.

(10) Patent No.: US 6,838,873 B2
(45) Date of Patent: Jan. 4, 2005

(54) POSITION SENSOR (75) Inventors: David Alun James, Harston Mill (GB); Darran Kreit, Harston Mill (GB); Ross Peter Jones, Harston Mill (GB); David John Stocks, Harston Mill (GB)

(73) Assignee: Scientific Generics Ltd. (GB)

( * ) Notice: Subject to any disclaimer, the term of this patent is extended or adjusted under 35 U.S.C. 154(b) by 0 days.

(21) Appl. No.: 10/483,099

(22) PCT Filed: Oct. 24, 2002

(86) PCT No.: PCT/GB02/04814
§ 371 (c)(1),
(2), (4) Date: Jan. 6, 2004

(87) PCT Pub. No.: WO03/038380
PCT Pub. Date: May 8, 2003

(65) Prior Publication Data
US 2004/0169505 A1 Sep. 2, 2004

(30) Foreign Application Priority Data

| Oct. 30, 2001 | (GB) | 0126014 |
| Mar. 4, 2002 | (WO) | PCT/GB02/01204 |
| Mar. 12, 2002 | (GB) | 0205778 |
| May 20, 2002 | (GB) | 0211559 |
| Jul. 31, 2002 | (GB) | 0217745 |
| Oct. 7, 2002 | (GB) | 0223112 |

(51) Int. Cl.$^7$ .................................................. G01B 7/14
(52) U.S. Cl. ........................ 324/207.22; 324/207.16
(58) Field of Search ........................ 324/207.11, 207.13, 324/207.14, 207.15, 207.16, 207.17–207.19, 207.22, 207.24, 244, 260

(56) References Cited

U.S. PATENT DOCUMENTS 4,282,485 A * 8/1981 Pauwels et al. ........ 324/207.18

* cited by examiner

Primary Examiner—Bot Ledynh

(57) ABSTRACT

A Position Sensor comprises: one or more excitation windings; a signal generator adapted to apply excitation signals to the or each excitation winding; tag means displaceable relative to said excitation windings; one or more sensor windings electromagnetically coupled to said excitation windings such that in response to said excitation signals being applied to said excitation windings, there is generated sensed signal in the or each sensor winding; and a signal processor adapted to process said sensed signals to determine the position of said tag means in any location in the X, Y and Z planes essentially in accordance with phase values or in accordance with phase values and amplitude values.

18 Claims, 5 Drawing Sheets

POSITION SENSOR

FIELD OF THE INVENTION

This invention relates to sensors which incorporate inductive means to determine the position of a tag in any of the X, Y and Z planes and utilises phase values or a combination of phase values and amplitude values in that determination.

BACKGROUND TO THE INVENTION

Standard tracking technologies are often based on either radio frequency (RF) or acoustic propagation and use time-flight or relative phase information to determine distance from a known transmit location. Whilst such technologies function without difficulty in open areas, applying these technologies to indoor multi-path environments with the reflections from floors, walls and other obstacles has encountered serious difficulties.

U.S. Pat. No. 4,282,485 presents a typical prior art inductive position sensor. In this particular patent application, the inductive position sensor is a so-called linear variable phase transformer (LVPT) incorporating two primary coils and a secondary coil, each formed by a plurality of generally circumferential turns of respective conductors about a non-magnetic bobbin. Within a hollow interior of the bobbin, a core is positioned for movement relative to the two primary coils and a secondary coil along the axis. This position sensor is therefore only capable of determining the core's position along a single axis. Since the coils need to be arranged about a bobbin it would be particularly impractical and almost impossible to scale up such systems to fit around living spaces to determine the position of tags placed therein.

One of the objectives of the present invention is to provide a position sensor which contrary to the sensor described in the context of the above prior art document is particularly well suited for operation within conventional living spaces such as offices, warehouses, factory floors etc. As part of this objective, the invention presents a position sensor which does not unduly protrude from ceilings or walls so as to facilitate straightforwvard retro-fitting without unduly burdening the aesthetics of any particular living space.

It is a further objective of the present invention to present a position sensor capable of determining the position of a tag in any position in the X, Y and Z planes.

It is also an aim of the present invention to provide tag means whose position may be determined irrespective of its own orientation, so that for example the tag's position may be determined while it is being rotated by an operator.

It is a further objective of the present invention to present a variety of processing means for use in sensors with particular operating properties, in order to maximise the operational efficiency of individual applications.

The present invention aims to provide a particularly versatile system which may be scaled up or scaled down to meet any particular requirement. The invention will particularly describe how a matrix of position sensors may be employed to monitor the position of tags throughout a collocation of living spaces such as a building.

SUMMARY OF THE INVENTION

In its broadest aspect, the invention presents a position sensor comprising:

One or more excitation windings;

A signal generator adapted to apply excitation signals to the or each excitation winding;

Tag means displaceable relative to said excitation windings;

One or more sensor windings electromagnetically coupled to said excitation windings such that in response to said excitation signals being applied to said excitation windings, there is generated sensed signals in the or each sensor winding; and A signal processor adapted to process said sensed signals to determine the position of said tag means in any location in the X, Y and Z planes, essentially in accordance with phase values or in accordance with phase values and amplitude values.

This combination of features is particularly advantageous because it permits the determination of the tag means' position in any location in the X, Y and Z planes. It is also particularly advantageous because this type of position sensor may be easily incorporated into a building to monitor movements of tag means therein. Additionally, utilising adequate signal processors to analyse phase values or a combination of phase values and amplitude values will permit particularly precise positional data to be derived.

In a subsidiary aspect one or more sets of excitation windings, the or each set of excitation windings incorporating a first winding adapted to generate a field with a largely sinusoidal variation along its length and a second winding adapted to generate a field with a largely cosinusoidal variation along its length.

Arranging the windings in this manner, allows different phase values to be obtained at different positions and therefore precise overall positional data.

In a further subsidiary aspect, two sets of excitation windings arranged essentially perpendicular to one another in order to produce X and Y excitation signals susceptible of being processed in order to identify the tag means' positions in the X, Y and Z directions.

This configuration is advantageous as it employs a minimal amount of windings to achieve the determination of the tag's position in the X, Y and Z planes.

In a further subsidiary aspect, the position of the tag means in the X and Y directions is determined from phase values and the position of the tag means in the Z direction is determined from amplitude values.

This minimises once again, the amount of windings required in order to determine a sufficiently accurate 3 dimensional tag position.

In a further subsidiary aspect, the or each excitation winding comprises a plurality of essentially co-planar loops arranged so that current flowing through the excitation winding flows around at least one of the loops in an opposite direction to at least one other of the loops.

Arranging the windings in this manner, allows the field strength to vary from one loop to the next to achieve the necessary rotational field along the length of the set of excitation windings.

In a further subsidiary aspect, the area of the or each loop in which the current flows in the clockwise direction is essentially equal to the area of the or each loop in which the current flows in the anti-clockwise direction.

Geometrically balancing the loops in this manner contributes to improving the quality of the measurements obtained from the position sensor as the field extends further away from the windings without losing its spatial pattern and is therefore on that basis alone advantageous.

In a further subsidiary aspect, the excitation windings are essentially co-planar.

Arranging the excitation windings in a co-planar fashion is particularly advantageous as the windings may be in this configuration easily attached to planar surfaces such as those defining common living spaces such as ceilings or walls. When placed in this configuration, the windings do not limit the mobility of the tag means as was the case in the prior art discussed in the previous section In a further subsidiary aspect, the or each tag means incorporates three sensor windings arranged in an essentially orthogonal relationship.

Arranging three sensor windings around orthogonal axes in the tag means is essential to achieving a tag means whose position may be determined irrespective of its orientation. Rendering the tag means orientation independent will of course augment the possible applications for this type of position sensor and improve the quality of the positional data as compared to conventional sensing devices.

In a further subsidiary aspect, at least one of the sensor windings is a one-loop receiver winding which extends essentially in the plane of each or both sets of excitation windings X and Y and the or each tag means incorporates echoing means.

This configuration is particularly advantageous as it permits the tag to incorporate only minimal components which will allow the tag to be particularly compact and cost effective to manufacture.

In a further subsidiary aspect, the one loop receiver winding overlaps at least part of each or both sets of excitation windings.

Conventional thinking would have that the one loop receiver winding be spaced around the excitation windings, however making the inventive step of arranging the receiver winding in the above manner, optimises the electromagnetic balancing of the system and therefore renders the overall position sensing more accurate.

In a further subsidiary aspect, a one-loop reference excitation winding overlaps at least part of each or both sets of excitation windings X and Y and is adapted to produce an essentially vertical field which translates into reference signals enabling the signal processor to determine the orientation of the or each tag means' sensor windings with respect to the vertical axis and to take into account the orientation of said sensor windings in its calculation of the position of the tag means.

Utilising a reference excitation winding will contribute to determining the tag's position irrespective of its orientation. The reference excitation winding may also be advantageous because it can be employed in the context of a transmission by beating rather than by amplitude modulation.

In a further subsidiary aspect, a Helmholtz pair of windings forms a reference excitation winding to determine the orientation of the tag means' sensor windings, the first of the windings being essentially in the same plane as excitation windings X and Y and the second being vertically spaced from the first.

Employing a Helmholtz pair of windings will be advantageous because it will generate a more consistent field. Similar benefits may be derived when Hehmholtz pairs of windings are employed to form excitation windings X and Y. Such Helmholtz pairs have the advantages of increasing X Y and Z accuracy, being operable in taller rooms and mitigating the distorting effects of large conducting objects.

In an additional subsidiary aspect, the or each excitation signal comprises a periodic carrier signal having a first frequency modulated by a periodic modulation signal having a second frequency, the first frequency being comprised within the range of 40–150 kHz and the second frequency being comprised within the range of 1–10 kHz.

In a further subsidiary aspect, the or each tag means incorporates means to modify the frequency of the sensed signals generated in the tag means' sensor windings and to transmit the modified signals.

This latest feature is advantageous because it allows several tags to operate within the sensing system and to be simultaneously located.

In an additional subsidiary aspect, the or each tag means incorporates weighting means to calculate position signals taking into account the reference signals and transmitting means to transmit signals to receiving means for further processing.

This arrangement allows the tag means to contribute in part to the processing of its position and will therefore reduce the further processing required.

In accordance with any of the preceding aspects, the invention presents a matrix of sensors.

Within the scope of the above aspects are included.

Balancing of the windings by electronic means.

Room ID encoding for a tag with processing means (so-called intelligent), either by frequency coding or by encoding digital data onto a separate frequency channel, or by phase encoding of a separate pair of beating frequencies, the extra signals being transmitted from the reference winding.

Room time and frequency multiplexing.

Room shielding (by for example grounding the steel reinforcements in the concrete of the building within which the position sensor operates).

Uniform frequency spacing of the excitation frequency for X, the two reference frequencies and the excitation frequency for Y.

Any patentable aspects of the algorithm as described hereafter.

DETAILED DESCRIPTION OF THE FIGURES

Figure 1:
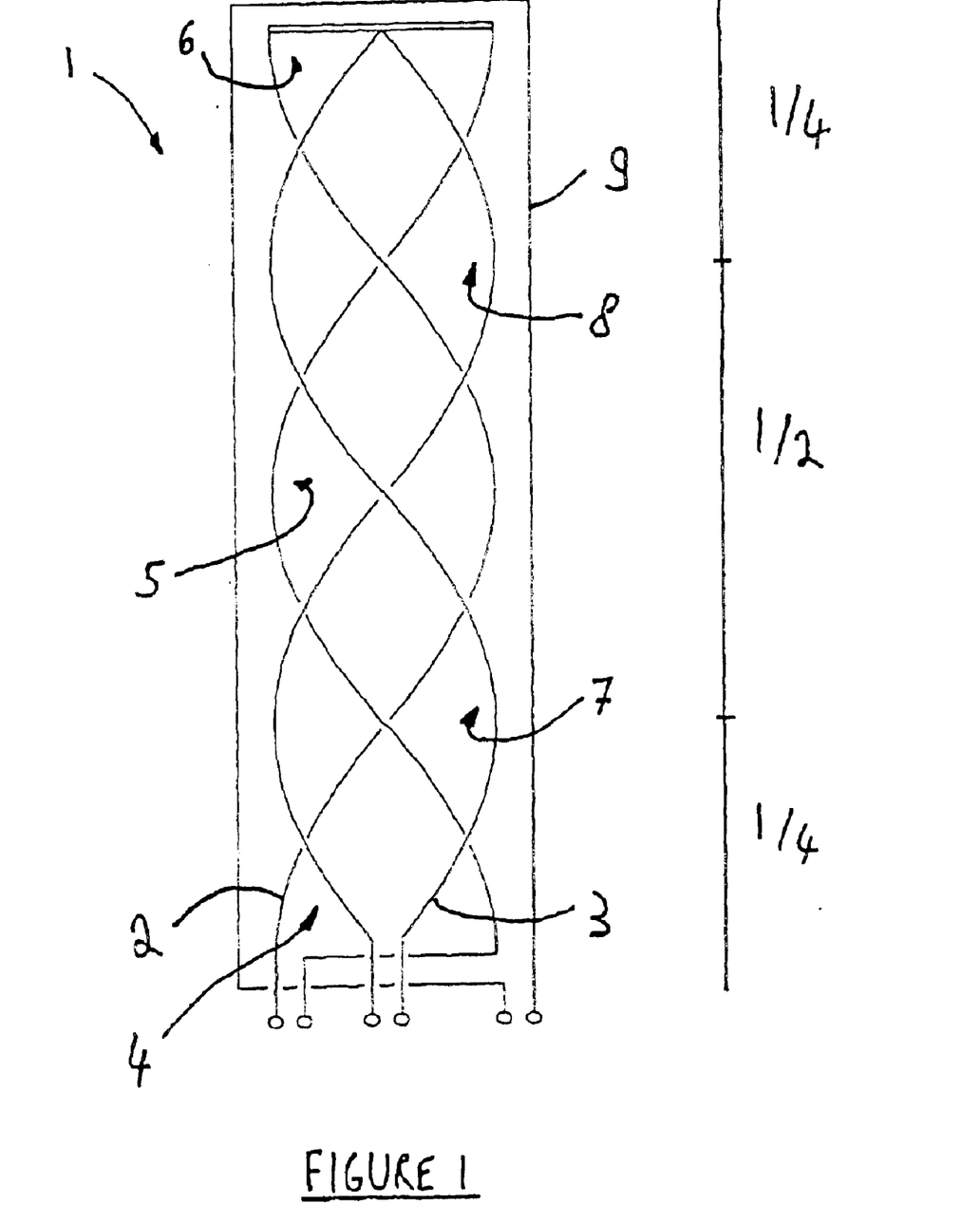
FIG. 1 shows a plan view of an arrangement of windings according to a first embodiment of the invention.

FIG. 1 presents an arrangement of windings generally referenced at 1. There are within this arrangement two excitation windings 2 and 3 and a reference or receiver winding 9.

The configuration of excitation winding 2 is such that, when excited, it generates a field with a largely cosinusoidal variation along its length. Winding 2 comprises a first loop 4 covering approximately a quarter of the length of the winding through which current flows in a first direction. The winding forms a further loop 5 adjacent to loop 4 which covers approximately half the total length of the winding and through which current circulates in the opposite direction from that of loop 4. A further loop generally referenced 6 of identical dimensions to loop 4 but symmetrically opposite and adjacent to loop 5 covers the remaining quarter portion of the winding's length.

Winding 3 extends in the same direction as winding 2 but is arranged so that it generates a field with a largely sinusoidal variation along its length. To achieve this, there are provided two loops 7 and 8 each covering half the winding's length, and arranged so that the current through one loop circulates in the opposite direction to that of the other loop.

A further winding referenced 9 is presented in FIG. 1, which incorporates one single loop. This winding may have several different applications, it may be used to generate a reference signal or simply as a receiver winding for receiving any signal echoed back from any tag means operating with the windings.

Winding 9 is shown extending along the outside of excitation windings 2 and 3. This is simply one of the possible configurations for winding 9. It is envisaged within the scope of this invention that winding 9 overlaps at least part of or in other words is placed partially within excitation windings 2 and 3. Placing winding 9 in this manner within excitation windings 2 and 3 will achieve optimum system electromagnetic balancing.

The arrangement described with reference to FIG. 1 is particularly well suited for generating excitation signals to facilitate the location of a tag (not shown in the figure) which is displaced along the length of the windings. It may also be employed to determine displacements in the direction perpendicular to the arrangement of windings through amplitude analysis.

Figure 2:
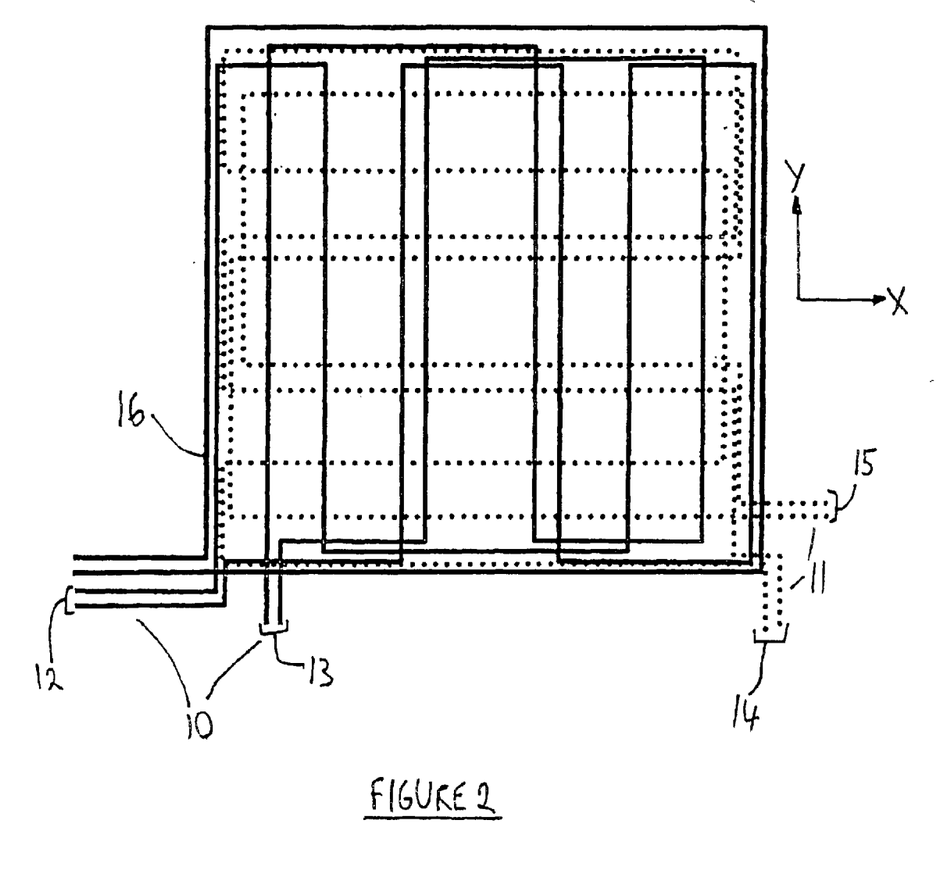
FIG. 2 presents a schematic plan view of an arrangement of windings according to a further embodiment of the present invention.

Complete three dimensional sensing may be achieved by the arrangement presented in FIG. 2. This Figure shows a set of windings 10 capable of generating a signal destined to determine a tag's position in the X direction and a set of windings 11 shown in dotted lines and arranged orthogonally to the set of windings 10 and which is susceptible of generating signals employed in determining a tag's position in the Y direction.

Both sets of windings 10 and 11 have a similar general structure to the structure of the windings described in FIG. 1. Windings 12 generate a field with a generally cosinusoidal variation along axis X and may be referred to as cos X. Windings 13 generate a field with a generally sinusoidal variation along the X axis (sin X). Windings 14 generate a field with a generally cosinusoidal variation along the Y axis (cos Y). Windings 15 generate a generally sinusoidal variation along the Y axis (sin Y).

The loops of the different windings 12, 13, 14 and 15 are essentially rectangular in shape so as to be particularly well suited for operation in conventional living spaces. Having rectangular loops is also practical as it allows them to be precisely located. Locating each loop precisely will help to ensure that the net area of all the positive loops for any of the windings is identical to the net area of the negative loops. A negative loop is defined to be one in which the current at the some instance in time is flowing in a clockwise direction around that part of the circuit and a positive loop is defined to be one in which the current at the same instance in time is flowing in an anti-clockwise direction around that part of the circuit. The precise location of the loops of the sine windings is relatively straightforward to achieve as there are only two loops. However, special care is required when locating the co-sine windings (windings 12 and 14). If these windings are not precisely located, as the distance from the windings increases, the larger loops begin to dominate the signal and may generate a relatively uniform field when moving away from the windings instead of the necessary rotational field.

One exemplary method of achieving the precise location of the arrangement of FIG. 2 is to divide a given room where these windings will be operating into twelve equal pieces, the edges of which are labelled from 0 to 12. In this example, the negative loops of winding 13 or 15 would run between labels 1 and 5, and the positive loops between labels 7 and 11. The negative loops of the winding 12 or winding 14 would run between labels 0 and 2, and between 10 and 12, and the positive loops would run between labels 8 and 12. By precisely labelling to divide a room in such a maimer, an increase in electronic breakthrough between the windings may occur which may require extra care in electronic balancing. In this context, reference winding 16 should be placed within the outer portions of excitation windings 12, 13, 14 and 15 in order to achieve adequate balancing.

This winding arrangement has the added advantage that the spatial variation of the electromagnetic field from the sinusoidal windings (13 and 15) has not decayed to 0 at the edges of the room (as would be required for a true sinusoidal variation). This arrangement has the further benefit of limiting the range of the phase angle obtained from such generating windings to be comprised, for example within the range of −120° to +120° depending on the vertical distance between the tag and the signal generating windings. By so limiting the range of angles obtained, the system overcomes potential problems of so-called 'wraparound' effect which occur when a tag suddenly appears to have moved from one side of the room to another (i.e. a flip from −180° to +180°). Limiting the range of angles in the above manner has a further advantage when employed in a matrix of rooms system, where if the determined angle falls outside the normal bounds, it is almost certainly a result of the stem receiving signals from a neighbouring room, so that even if the field leaks out from one room to another, it is possible to discount erroneous signals.

Figure 3:
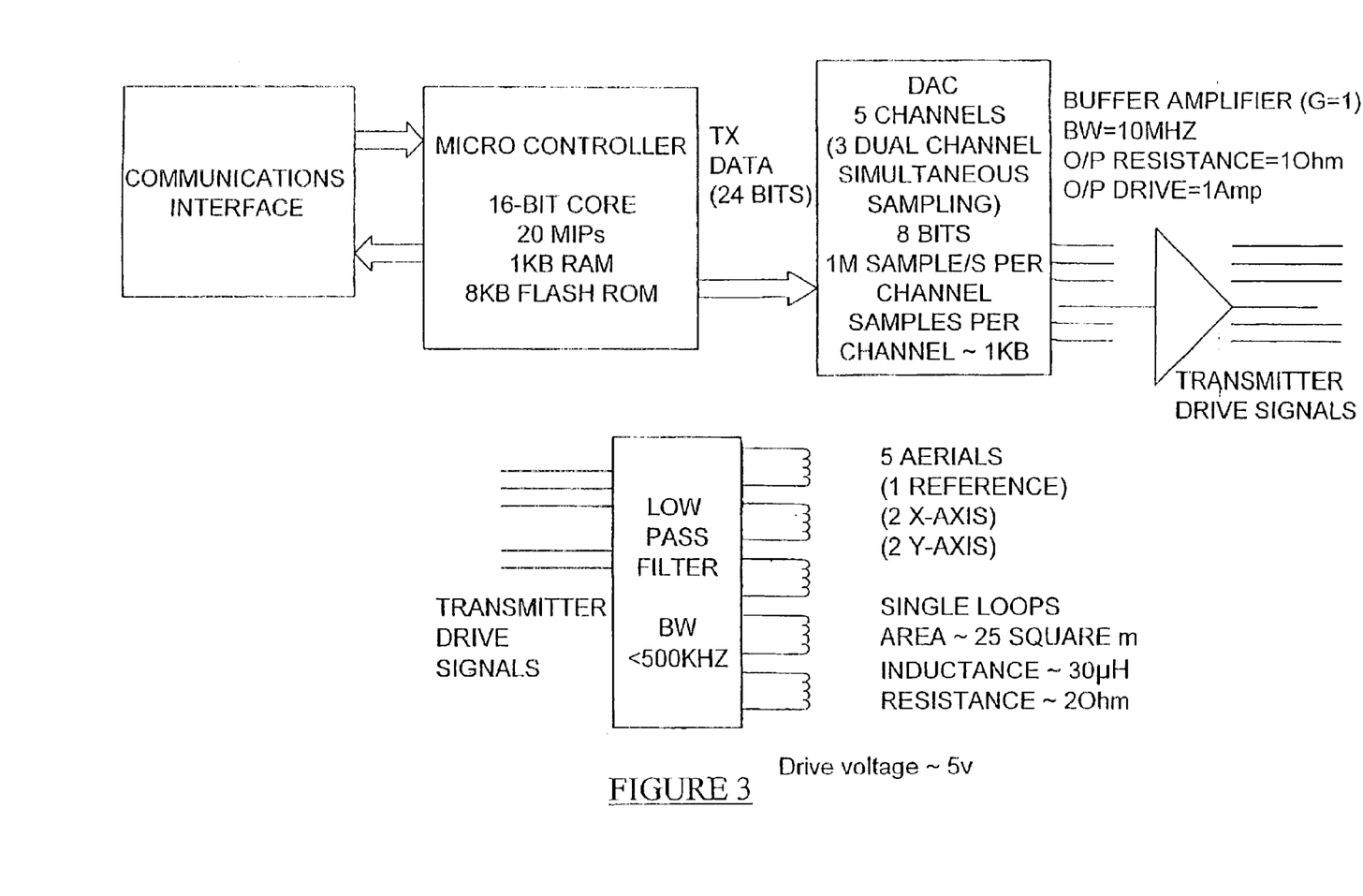
FIG. 3 shows a system level diagram operating in conjunction with the windings described with reference to FIG. 2.

FIG. 3 shows an example of the means used to process the signals. The system described in this diagram is destined to operate with two excitation X windings, two excitation Y windings and one reference winding, all of these being arranged to sense the position of a tag in a 25 m² area. The level diagram includes a communications interface, a micro controller (16-bit Core, 20 MIPs, 1 kB RAM, 8 kB FLASH ROM), a digital to analogue converter (5 Channels (3 dual channel simultaneous sampling, 8 bits, 1 M samples/s per channel, Samples per Channel~1 kB), a buffer amplifier (G=1, BW=10 MHz, O/P resistance=1 Ohm, O/P drive=1 Amp) and a low pass filter (BW<500 kHz). Each of these are of known kind and it would be superfluous to describe the circuitry involved with these different levels.

Figure 4:
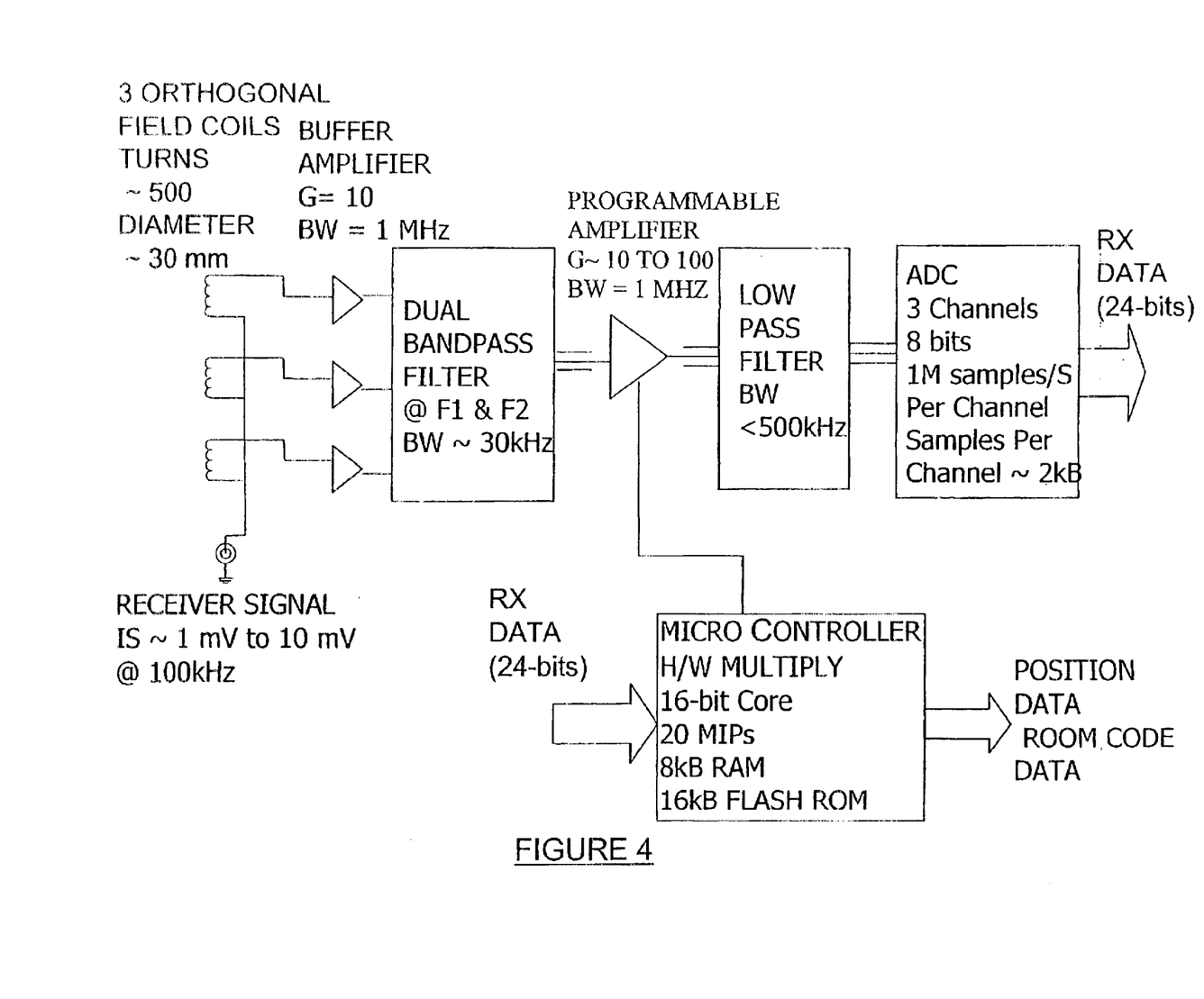
FIG. 4 shows a system level diagram operating in conjunction with the tag means of the system.

FIG. 4 shows an example of a possible system level diagram for a tag operating with three orthogonal field coils or sensor windings(Turns~500, diameter~30 mm), a buffer amplifier (G=10, BW=1 MHz), a dual band pass filter (at F1&F2, BW~30 khz), a programmable amplifier (G~10 to 100, BW=1 MHz) operatively connected to a microcontroller (H/W Multiply, 16-bit Core, 20 MIPs, 8 kB RAM, 16 kB FLASH ROM) to generate position and/or room code data, the tag also operating with a low pass filter (BW<500 kHz) which is itself operatively connected to a ADC (3 channels, 8 bits, 1 M samples/s per channel, Samples per channel~2 kB). This particular arrangement comprises conventional components employed in achieving signal processing. The invention is however not limited to this particular exemplary system and will be appropriately modified by the person skilled in the art for any given application within the scope of the invention.

Figure 5:
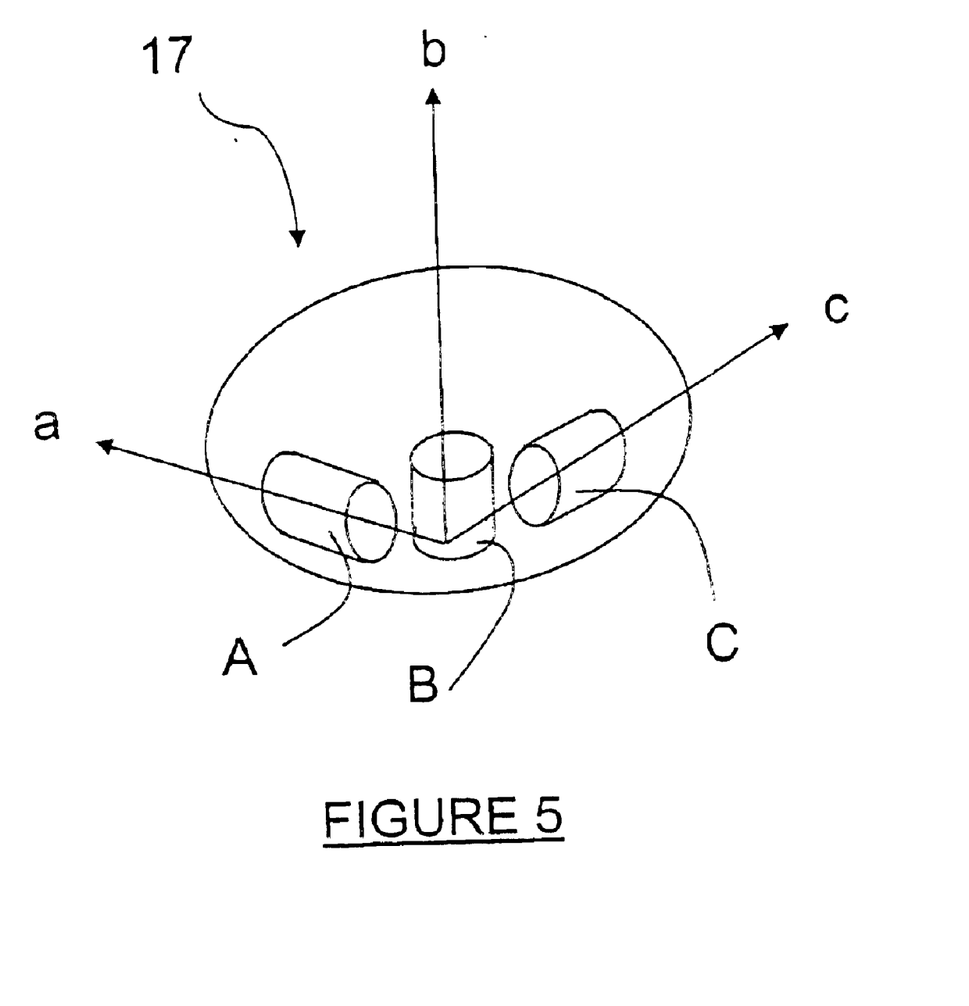
FIG. 5 presents a perspective schematic view of a tag.

FIG. 5 shows a schematic view of a tag 17 comprising three orthogonal sensor windings A, B and C. Bach sensor winding extends along an axis of the set of orthogonal axes a, b and c. The sensor is free to displace in any given fashion in the field generated by the windings described with reference to FIGS. 1 and 2. If a reference signal is produced by the reference winding, the tag's possible rotation may be determined through the processing means described above. Quantifying the tag's position in this manner, will allow accurate positional measurements to be determined irrespective of the tag's rotational position.

The phase angle of the rotating field generated by excitation windings of the type described with reference to FIGS. 1 and 2 varies for each tag position in the X and Y plane. The phase angle of the rotating field is however largely independent of the spacing in the direction perpendicular to the sets of windings between the tag and the excitation windings. By measuring the phase angle at an arbitrary point, the position in the X and/or Y axis can be determined and by examining the amplitude of the signal at that point, the spacing from the excitation windings (the Z direction) can be determined.

In the most basic form of the invention's system where the windings take the form of that shown in FIG. 1 and amplitude modulation (AM) is chosen in generating the signal, the mathematics will follow the steps described below.

For a carrier frequency of $f_0$, and an amplitude modulation frequency (the rotation frequency) of $f_1$, the time-varying waveform transmitted on cosine winding 2 is given by:

$$C(t)=\cos(2\pi f_0 t)*\cos(2\pi f_1 t).$$

The time-varying waveform transmitted on the sine winding 3 is given by:

$$S(t)=\cos(2\pi f_0 t)*\sin(2\pi f_1 t)$$

The spatial shape of the windings described in detail with reference to FIG. 1 creates a total transmit field which has a vertical component given by:

$$\cos(2\pi f_0 t)*[\cos(2\pi f_1 t)*\cos(2\pi x/\lambda)+\sin(2\pi f_1 t)*\sin(2\pi x/\lambda)]$$

(where $\lambda$ is the pitch of the windings, i.e. the distance over which the magnetic field rotates by 360°, and X is the distance moved along the length of the windings) rearranging the above equation, the vertical component of the transmit field is given by:

$$\cos(2\pi f_0 t)*\cos(2\pi [f_1 t-x/\lambda])$$

and the horizontal component of the field along the axis of the winding of FIG. 1 is:

$$\cos(2\pi f_0 t)*\sin(2\pi [f_1 t-x/\lambda])$$

This results in a field which rotates in time at a frequency of $f_1$, and the phase of this rotation is proportional to the horizontal position or position along the X axis.

A horizontally orientated sensor winding (so that the axis of the winding is vertical) will pick up the vertical component of this transit field.

If the tag is a so-called 'dumb' tag simple echoing means may be provided to echo the signal onto a receiver winding arranged essentially in the same plane as the excitation windings. Referring briefly to FIG. 1, this receiving winding could be winding 9. Given this signal, it is a matter of synchronous detection at the carrier frequency $f_0$ and a comparison of the phase of the modulation to that of the cosine or sine winding. It is then straightforward to de-code this relative phase into a position—for example if the comparison is the difference, $\theta$ in radians, between the modulation on the cosine transmit signal and that on the received signal, then the position, X, is defined as:

$$X=\theta*\lambda/(2\pi)$$

The invention is not limited to this particular comparison, similar algorithms may be employed for the comparison to the sine modulation but in that case with a $\pi/2$ correction.

The present inventive system operates in conjunction with the near-field characteristics of the excitation windings, and is therefore unaffected by the multi-path issues that can cause problems to travelling wave technologies such as ultra sonic or RF based, time-off-flight phase measuring systems.

One inventive aspect of the present invention has provided means to reduce or eliminate phase changes due to for example resistors, capacitors, filters and amplifiers. This can be achieved by reversing the rotation direction of the positioning field, simply by negating the sign of the modulation signal transmitted on the sine windings, and averaging between the results obtained in the reverse mode and the forward rotation mode and may be referred to as the bounce-back process. This same process has the additional benefit of reducing the distorting effects of metallic objects in the vicinity of the windings. This process need only be done intermittently, as once the phase error is known, it can be systematically removed from the position determined by the forward rotation.

It is however thought to be particularly advantageous to operate the system at carrier frequencies in the range of 40–150 kHz and a rotation frequency of 1–10 kHz. Within this range, the system will operate below the self-resonance frequency of the excitation windings, and in the unlicensed frequency bands while still maintaining a sufficiently high measurement band width. A sufficiently high frequency is employed to ensure that sufficiently high signal levels are achieved in the tag windings and in the receiver winding.

In the case where the excitation windings operate alongside receive or reference winding, inductive pick-up between the windings may cause them to both re-transmit the signals from the other windings. This would have the effect of altering the spatial configuration of the overall transmit fields. The present invention provides for means to electronically balance these windings by sensing the open circuit potential difference across each individual winding due to the transmissions from each of the other windings and opposing the sum of those voltages across the winding when the system is fully active by a balancing drive signal. This electronic balancing may also be useful to balance windings when a proper balance is difficult to obtain due to physical constraints present in the living space within which the windings are designed to operate such as for example pillars.

In the above section, the system was described as generating signals which have been amplitude modulated. The invention is however not limited to such an arrangement and since it envisages the transmission of a reference field alongside the X and Y excitation signals, the present invention considers the use of beating between the transmissions of the excitation winding and the reference excitation winding. The reference signals may be set to beat at the same frequency. In order to guarantee that the reference beat retains its spatial homogeneity, a second frequency is transmitted on the reference winding so that the difference between the two reference frequencies is the same as the difference between the first reference frequency and the excitation winding's frequency.

Each separate room requires four distinct frequencies. In order to achieve the beating effect for both the X and Y varying winding signals—one for the X position fx, one for the Y position fy and two for the reference signal (ref1 and ref2). These four transmit frequencies are all separated by a frequency df, so that ref1=fx+df; ref=ref1+df and fy=ref2+df.

The skilled person in the art will understand the invention to extend to matrices of the different living spaces or rooms, each room having its own set of excitation windings.

The processing means of a so-called intelligent tag of the type illustrated in FIG. 4 will be easily adapted to be sensitive to particular room identities. This may be achieved by for example frequency coding or by encoding digital data onto a separate frequency channel or by phase encoding of a separate pair of beating frequencies. Any such extra signal will be transmitted from the reference winding. The signals may be also time or frequency multiplexed, the extent of which will be determined by the person skilled in the art from a range of known alternatives.

Amongst these various processing techniques, frequency separation is particularly envisaged as it allows faster update rates on each tag. In order to implement the frequency separation between neighbouring rooms, different start frequencies (i.e. fx) but the same value of df are chosen for each room. The four colour theorem states that four distinct room frequency types are sufficient to avoid interference from neighbouring rooms. In a basic four room system, typical frequencies of operation may be fx=92, 94 kHz and df=10 kHz for a first colour room, with the $2^{nd}$ to $4^{th}$ colour rooms operating with the same value of df, but starting at fy=92, 94 and 96 kHz respectively. This spreads the entire operating frequencies in this example from 90 kHz up to 126 kHz and as each of these frequencies can be made to be transmitted continuously as a tone, there is a little energy in any additional side lobes of this spectrum. This particular frequency band is also advantageous because it lies within the unlicensed band, whilst still allowing good inductive coupling from the transmit windings to the tag. The 2 kHz spacing between each tone also minimises any errors caused by frequency cross-talk as a result of the finite bandwidth in the Fourier transform. If the tones are purer with lower sidebands, the Fourier transform gives better resolution as less sample points are required and so closer spacing would be achievable. The 2 kHz figure is an advantageous frequency as it balances particularly well between lower cost electronics and faster response time for the tag and minimises the frequency spectrum required for the system.

The mathematics for this system when utilising the three orthogonal windings described with reference to FIG. 5 and labelled A, B and C. The frequency component in winding A for the fx field is defined as $A_1$, the ref1 frequency as $A_2$, the ref2 frequency as $A_3$ and the fy field as $A_4$. Similar components may be defined for windings B and C. The following expressions may be determined:

$$A_x = \frac{A_1 * A_3}{(A_2/|A_2|)^2} \quad A_y = \frac{A_4 * A_2}{(A_3/|A_3|)^2}$$

From the above expressions, the X and Y angles and therefore the X and Y positions may be determined by:

$$\theta_x = arg(A_x + B_x + C_x) \quad \theta_y = arg(A_y + B_y + C_y)$$

The Z⁻ position is then determined from the ratio of the magnitude of the reference and the excitation signals, such that:

$$z = f\left(\sqrt{\left[\frac{|A_2|^2 + |B_2|^2 + |C_2|^2 + |A_3|^2 + |B_3|^2 + |C_3|^2}{|A_1|^2 + |B_1|^2 + |C_1|^2 + |A_4|^2 + |B_4|^2 + |C_4|^2}\right]}\right)$$

In order to further simplify the electronics of this system, the invention also envisages that each sensor winding can be sampled sequentially. Sequential sampling would permit for example the use of only one amplifier and ADC, rather than one of such arrangement per channel.

The processing means may be arranged in a variety of operational modes about the excitation windings or the tag means. For example, the position data generated by the tag can be stored on the tag for later retrieval or it can be transmitted over a wireless link (eg. DECT) to a central node for further processing. The tag may be equipped with advanced processing means which can calculate its own position (intelligent tag) or alternatively be deprived of any such means but equipped with means facilitating the transmission of raw signals or just the Fourier coefficients derived from the or each sensor winding. A central node would then be incorporated within the system and adapted to receive and calculate the position of all the tags.

In a matrix of position sensors this latest option may be particularly beneficial as it will undoubtedly economise on the overall processing means required. The person skilled in the art will take into consideration the available wireless bandwidth and the costs of the tag and the system generally.

While the tag means described above has incorporated three orthogonal sensor windings and excitation windings capable of generating four positional signals and a reference signal, the invention is however not limited to that particular configuration. It will be understood by the skilled reader that in certain applications a reduced number of windings may be employed. For example when a tag is placed in a Supermarket trolley, it would always move parallel to the floor and it would therefore be superfluous to provide the position sensor with all the windings described above. It would be possible for example to do away with the reference winding utilised in determining changes in the position in the direction perpendicular to the array of excitation windings. The tag itself may be simplified by, for example, utilising a single sensor winding. The algorithms will also correspondingly be simplified.

Whilst the above description has concentrated on indoor tracking applications, the invention is however not limited in that way. The position sensor may be equally operable in outdoor applications, for example to track the position of tags in a village. Also the excitation windings needn't be located overhead. For example, they could be placed beneath the ground surface which would be out of sight and prevent them being removed during use.

The accuracy requirements for village tracking may also be less stringent allowing the windings themselves to be proportionally larger and there would therefore be proportionally less cables required. Excitation windings covering an area of 150 m² would be employed to generate an accuracy of a few centimeters.

What is claimed is:

1. A position sensor comprising:
   at least one excitation winding;
   a signal generator for applying excitation signals to said at least one excitation winding;
   a tag means displaceable relative to said excitation winding;
   at least one sensor winding;

means electromagnetically coupling said sensor winding to said excitation winding, whereby in response to said excitation signals being applied to said excitation winding, there is generated sensed signals in said sensor winding; and a signal processor for processing said sensed signals to determine the position of said tag means in any location in the X, Y and Z planes in accordance with phase values.

2. A position sensor according to claim 1, wherein the signal processor determines the position of said tag means in any location in the X, Y and Z planes in accordance with phase and amplitude values.

3. A sensor according to claim 1, comprising at least one set of excitation windings, with at least one set of excitation windings incorporating a first winding and means for generating a field with a largely sinusoidal variation along the winding's length; and a second winding and means for generating a field with a largely consinusoidal variation along said winding's length.

4. A sensor according to claim 1, comprising two sets of excitation windings, excitation winding X and excitation winding Y, arranged essentially perpendicular to one another in order to produce X and Y excitation signals susceptible of being processed in order to identify the tag means positions in the X, Y and Z planes.

5. A sensor according to claim 2, wherein means are provided for determining the position of the tag means in the X and Y directions from phase values and the position of the tag means in the Z position is determined from amplitude values.

6. A sensor according to claim 1, wherein at least one excitation winding comprises a plurality of essentially coplanar loops arranged so that current flowing through the excitation winding flows around at least one of the loops in an opposite direction to at least one other of the loops.

7. A sensor according to claim 6, wherein the area of at least one loop in which the current flows in the clockwise direction is essentially equal to the area of at least one loop in which the current flows in the counter-clockwise direction.

8. A sensor according to claim 1, wherein the sensor has a plurality of excitation windings which are essentially coplanar.

9. A sensor according to claim 1, wherein said at least one tag means incorporates three sensor windings arranged essentially around orthogonal axis.

10. A sensor according to claim 4, wherein at least one sensor winding is a one-loop receiver winding which extends essentially in the plane of at least one set of excitation windings X and Y and said tag means incorporates echoing means.

11. A sensor according to claim 10, wherein said one-loop receiver winding overlaps at least part of at least one excitation winding.

12. A sensor according to claim 1, wherein the sensor incorporates a one-loop reference excitation winding which overlaps at least part of at least one excitation winding and which is adapted with means to produce an essentially vertical field which translates into reference signals; and the processor is adapted with means for determining the orientation of the tag means' sensor windings with respect to a vertical axis and with means for taking into account the orientation of the sensor winding in a calculation of the position of the tag means.

13. A sensor according to claim 4, wherein a Helmholtz pair of windings forms a reference excitation winding to determine the orientation of the tag means' sensor windings, the first of the windings being essentially in the same plane as excitation windings X and Y and the second being vertically spaced from the first.

14. A sensor according to claim 1, wherein Helmholtz pairs of windings are employed to form a set of excitation windings X and a set of excitation windings Y.

15. A sensor according to claim 1, wherein at least one excitation signal comprises a periodic carrier signal having a first frequency modulated by a periodic modulation signal having a second frequency, the first frequency being comprises within the range of 40–150 kHz and the second frequency being comprises within the range of 1–10 kHz.

16. A sensor according to claim 1, wherein at least one tag means incorporates means to modify the frequency of the sensed signals generated in the tag means' sensor windings and to transmit the modified signals.

17. A sensor according to claim 1, wherein the tag means incorporates means to calculate position signals and transmitting means to transmit the signals to receiving means for further processing.

18. A matrix of sensors according to claim 1.

* * * * *